Aug. 16, 1966
M. A. MacDONALD
3,266,667
ARTICLE-FEEDING APPARATUS HAVING ARTICLE
TRACKWAYS WITH VARYING CLEARANCES
Filed Dec. 15, 1964
3 Sheets-Sheet 1
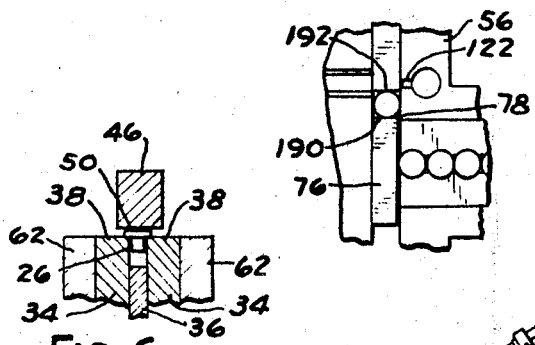
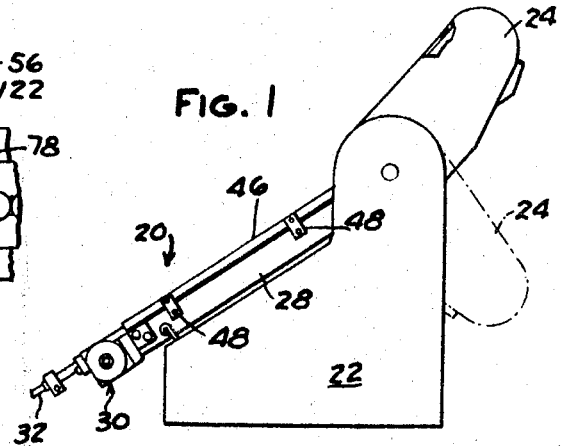
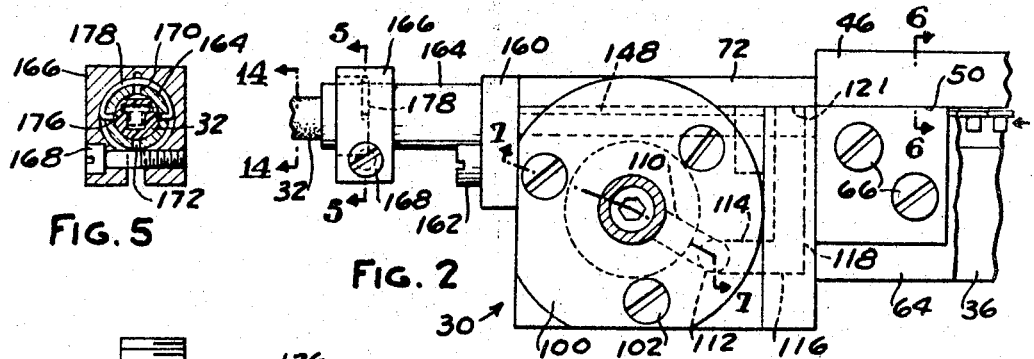
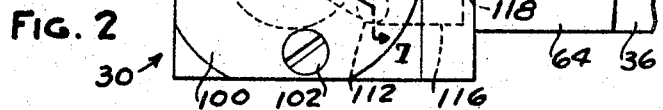
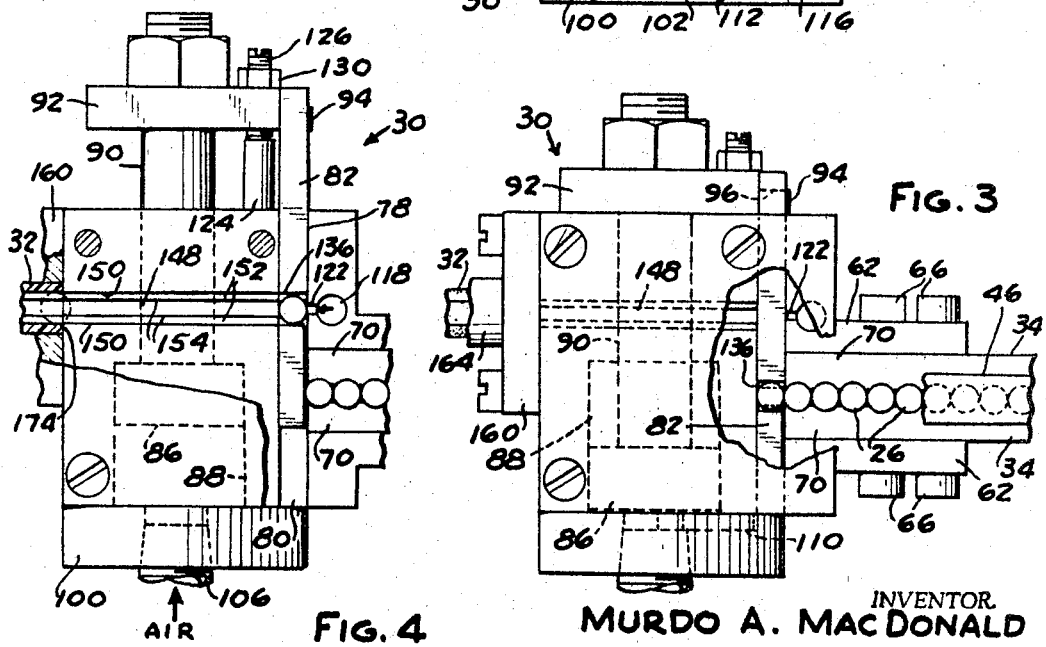
INVENTOR.
MURDO A. MacDONALD
BY
Barnes, Kisselle, Raisch & Choate
ATTORNEYS

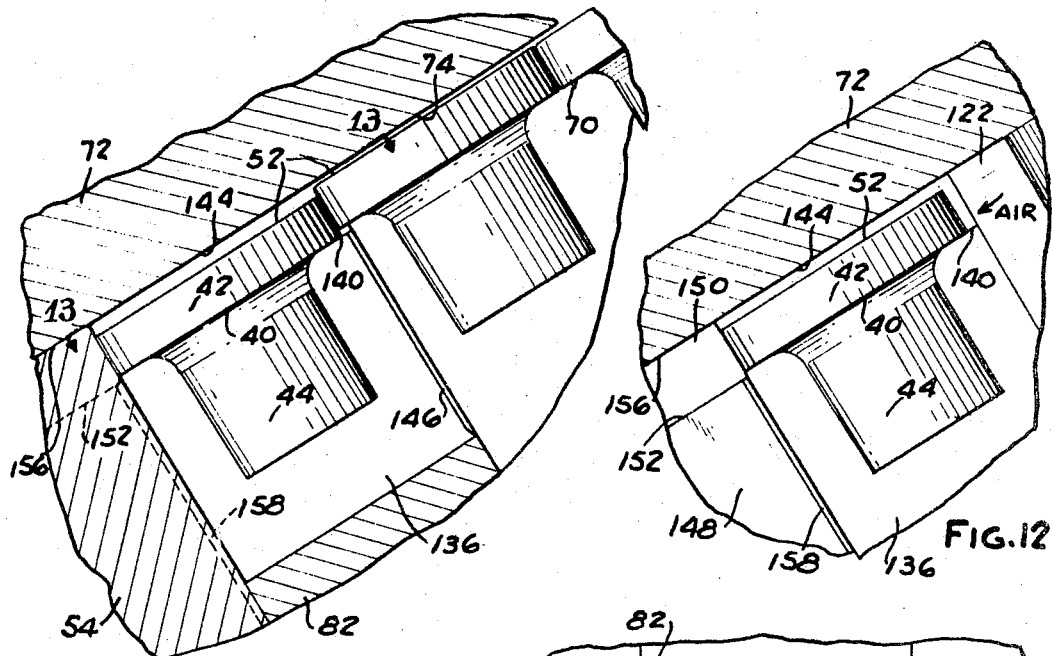
Fig. 11
Fig. 12
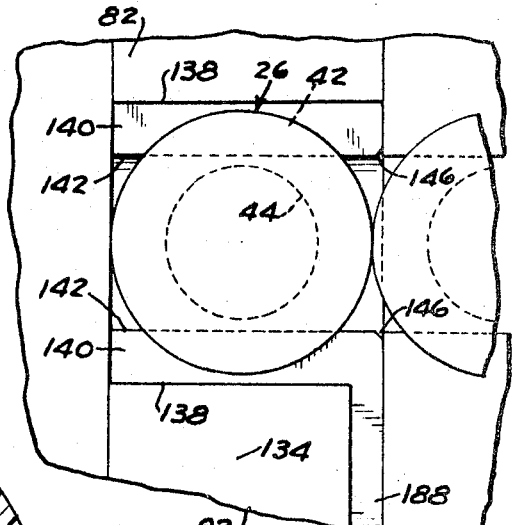
Fig. 13
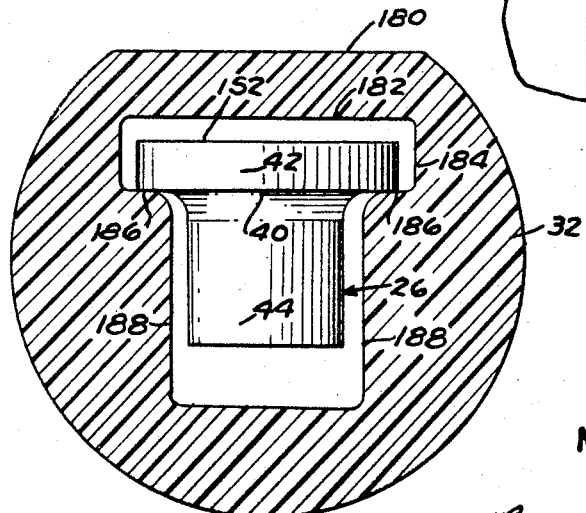
Fig. 14
INVENTOR.
MURDO A. MacDONALD
BY
Barnes, Kisselle, Raisch & Choate
ATTORNEYS

United States Patent Office 3,266,667
Patented August 16, 1966

3,266,667
ARTICLE-FEEDING APPARATUS HAVING ARTICLE TRACKWAYS WITH VARYING CLEARANCES
Jrdo A. MacDonald, Detroit, Mich., assignor to Tru-/Tork, Inc., Birmingham, Mich., a corporation of Michigan
Filed Dec. 15, 1964, Ser. No. 418,467
10 Claims. (Cl. 221—177)

This invention relates generally to apparatus for feeding articles one at a time upon demand from a source to a desired delivery point. The apparatus is especially well adapted for use in connection with articles which are difficult to deliver in a particular desired attitude or orientation. The apparatus is also especially well adapted from delivering articles from floor level hoppers through tortuous paths to various kinds of equipment used in modern-day automated manufacturing lines, and the delivery point may be moving as well as stationary.

It is conventional in certain industrial plants to feed some parts which are easily orientable and easily fed by gravity, such as relatively heavy nuts, from overhead hoppers through rigid tracks to automated machinery. This system is objectionable in that the hoppers must usually be relatively high in the air, for example, 15' to 18' or more, which requires space-consuming supporting structure and also physical labor in carrying supplies of nuts to the hoppers. Because of frictional track resistance, these gravity-feed systems are in general unsatisfactory for feeding parts over relatively long distances or through curved paths where the parts are small or light weight or of unusual shape which are hard to deliver in a predetermined attitude.

Some attempts have been made to feed parts to automated equipment by means of compressed air, but conventional article-feeding devices of this type have not been sufficiently reliable for use in continuous relatively high speed automated production lines wherein a single failure of the feeding device can result in shutting down the entire production line. A primary defect in conventional apparatus is that the articles being fed therethrough frequently tilt or cock and catch on surfaces defining the track or passageway involved and fail to reach the delivery point. Another difficulty lies in controlling the attitude of the articles. These two difficulties compound each other. A third difficulty is that under compressed air delivery, the article sometimes attains too great a velocity resulting in damage to the article or the equipment to which it is delivered on impact at the delivery point.

The object of this invention is to provide a relatively simple, inexpensive feeder structure improved to deliver articles from a floor-level hopper, in a predetermined titude, one at a time upon demand, through a tortuous ath if required, to a delivery point which may be either moving or stationary, and to function through thousands of successive cycles with sufficient reliability to meet the demands of relatively high speed, continuously operating, automated production lines.

Generally, the invention contemplates the use of a hopper fed track which has control surfaces for maintaining the articles therein in a predetermined attitude. A shuttle transfers the articles one at a time into alignment with a pneumatic passageway through which the article is propelled to the delivery point by air under pressure. The shuttle and passageway also have control surfaces which maintain the article in its predetermined attitude. In general, the control surfaces have relatively close tolerances with respect to the articles. Slightly enlarged tolerances are provided at the upstream ends of the portions of the shuttle and passageway which receive the article in order to eliminate corners or the like on which the articles might catch.

A portion of the pneumatic passageway is a flexible tube which can be bent through a tortuous path and whose delivery end can be connected to a delivery point which is either mobile or stationary. The tube is internally contoured to provide control surfaces for maintaining the article in its predetermined attitude. These control surfaces are more widely spaced than the control surfaces upstream thereof so that they will not bind against the articles in regions where the tube is curved around a relatively sharp corner. The increased spacing between the control surfaces also permits air flow past the article so that the article under a normal range of air pressures does not attain a velocity so great as to cause damage at the delivery point.

Other structural details in accordance with the invention appear in the following description. Selected for illustration of the invention is a device adapted to feed relatively small, headed studs to a delivery point. One form of the invention is shown in the accompanying drawings.

FIG. 1 is a partly diagrammatic side elevational view of apparatus according to this invention.

FIG. 2 is a fragmentary generally elevational view of a part of the apparatus on an enlarged scale.

FIG. 3 is a fragmentary top plan view of the apparatus shown in FIG. 2 with parts broken away and shown in phantom to illustrate structural details.

FIG. 4 is a view similar to FIG. 3 with certain components shown in a different position and the major portion of a cover plate broken away.

FIG. 4A is a fragmentary view generally similar to FIGS. 3 and 4 but showing a shuttle in an intermediate position.

FIG. 5 is a generally sectional view on line 5—5 of FIG. 2.

FIG. 6 is a generally sectional view on line 6—6 of FIG. 2.

FIG. 11 is a greatly enlarged partly diagrammatic sectional view illustrating structural detail at the juncture between the magazine track and transfer slide.

FIG. 12 is a greatly enlarged partly diagrammatic sectional view illustrating structural detail at the juncture between the transfer slide and a guideway.

FIG. 13 is a sectional view on line 13—13 of FIG. 11.

FIG. 14 is a greatly enlarged sectional view on line 14—14 of FIG. 2.

Figure 7:
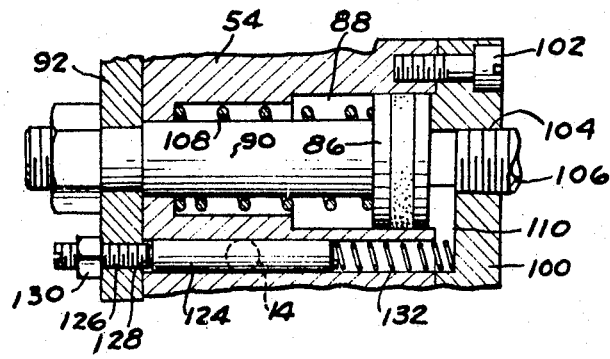
FIG. 7 is a fragmentary sectional view on line 7—7 of FIG. 2.

Shown in FIG. 1 is a feeding apparatus 20 according to this invention mounted on a stand 22 which also supports a hopper 24 oscillating vertically between the solid- and dotted-line positions shown for introducing a series of studs 26 into the apparatus as described more fully below. Hopper 24 is of the type which has a top opening into which a mass of studs may be poured.

The feeding apparatus includes a sloping magazine track 28 whose upper end is disposed within hopper 24 and which supports a feeder assembly 30 at its lower end. The feeder assembly transfers studs 26 one at a time from a train of studs in track 28 (FIG. 3) to an offset location (FIG. 4) where the stud is propelled by compressed air into and through a flexible tube 32 to the desired delivery point.

Track 28 comprises two rails 34 secured to an interposed spacer 36 so that the rails provide spaced-apart shoulders 38 which slidably and supportingly engage the undersurfaces 40 of stud heads 42 with stud shanks 44 disposed between the rails. A bar 46 is anchored over the top of the space between rails 34 by such means as bolted brackets 48. The bottom surface 50 of bar 46 is spaced above shoulders 38 a distance less than twice the thickness of stud heads 42 to prevent the stud heads from overlapping one another while in track 28. However, this spacing is sufficient to provide a slight clearance between bottom surface 50 and top surfaces 52 of the stud heads to permit free gravitational sliding of the studs down the track.

Figure 10:
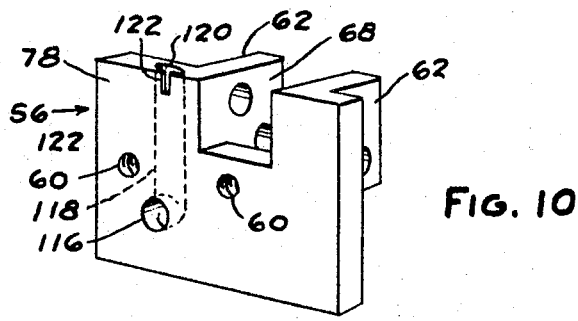
FIG. 10 is a perspective view of an end plate forming a part of the feeder body.

Feeder 30 has a body which includes a block 54 and a plate 56 secured thereto as by bolting through bolt holes 58 and 60 in the block and plate respectively. Body plate 56 has outwardly projecting lugs 62 between which the lower ends 64 of rails 34 are bolted as at 66. Plate 56 has an opening 68 (FIG. 10) between lugs 62 and into which the lower end extremities 70 of rails 34 project. The feeder body has a cover plate 72 which extends over rail portions 70 and abuts the lower end face of bar 46 (FIG. 2). The undersurface 74 (FIG. 11) of the cover plate in this region forms a continuation of the track top formed by the undersurface 50 of bar 46.

Figure 9:
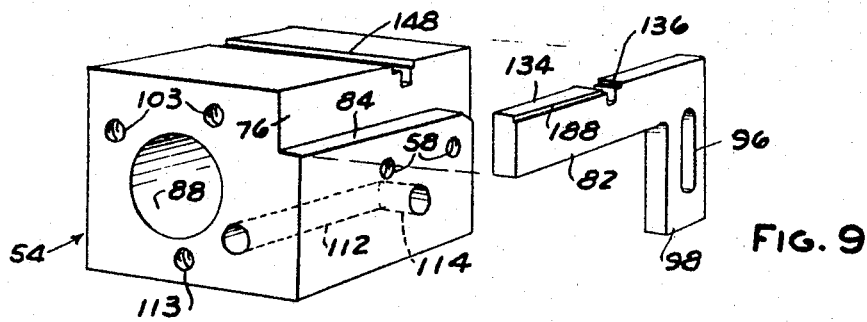
FIG. 9 is an exploded perspective view of the feeder body and shuttle or transfer slide.

Block 54 has a notched portion 76 (FIG. 9) which cooperates with the inner face 78 of plate 56 to define a recess 80 within which a shuttle or transfer member 82 slidably reciprocates. Slide 82 bottoms on a shoulder 84 at the bottom of the recess.

Shuttle 82 is reciprocated by a pneumatic piston 86 in a cylinder bore 88 in block 54, the piston having a rod 90 connected to a crosshead 92 having a laterally projecting lug 94 which engages within a slot 96 in a leg 98 extending downwardly from shuttle 82. Cylinder bore 88 is closed by a cap 100 secured to block 54 by bolts 102 received in bolt holes 103 in the block. Cap 100 has an opening 104 into which a fitting 106 is threaded for admitting air under pressure into cylinder 88. Piston 86 is moved upwardly as FIGS. 3 and 4 are viewed or to the left as FIGS. 7 and 8 are viewed by air under pressure introduced into cylinder 88 and the piston is returned by a spring 108 when the air pressure is relieved.

The inner face of cap 100 is recessed to provide a lateral passageway 110 which communicates with a passageway 112 in block 54. Passageway 112 has a portion 114 which turns laterally into communication with a passageway 116 in plate 56. Passageway 116 turns upwardly as at 118 and opens through a top of plate 56 at 120. However, this opening is pneumatically closed by portions 121 of the bottom surface of cover plate 72 (FIG. 2). Adjacent this opening is a port 122 through which air flows for propelling a stud 26 into and through tube 32.

Within passageway 112 is a slidable metering valve pin 124. The longitudinal, metering position of pin 124 in passageway 112 is controlled by an adjusting screw 126 threaded through crosshead 92 and having an end 128 which projects into passageway 112. When air is introduced into cylinder 88 and through passageway 110 into passageway 112, pin 124 is forced to the left from the FIG. 7 position to the FIG. 8 position following the inner end 128 of the adjustment screw. When piston 86 is fully advanced to the left as in FIG. 8, the righthand end of pin 124 will expose a greater or lesser area of passageway 114 and thereby meter the flow of air to port 122 in accordance with the adjusted position of screw 126. Screw 126 is locked in adjusted position by a nut 130.

Figure 8:
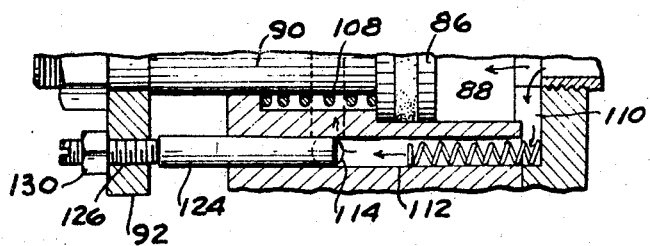
FIG. 8 is a fragmentary view similar to FIG. 7 but showing components in a different position.

A spring 132 in the righthand end of passageway 112 as FIGS. 7 and 8 are viewed prevents valve pin 124 from sliding completely to the righthand end of passageway 112 to insure that the right end face of the pin is positioned to be exposed to air under pressure during the subsequent cycle of operation.

Shuttle 82 has a top surface 134 through which a notch 136 opens. The notch has upper side surfaces 138 spaced apart to receive a stud head 42 and has spaced-apart shoulders 140 for supporting the undersurface 40 of a stud head 42. Beneath the shoulders, the notch has side surfaces 142 between which the shank 44 of a stud in the notch is disposed. Shoulders 140 are spaced slightly further from the overlying bottom surface portion 144 of cover plate 72 than are upper rail surfaces 70 from bottom surface portion 74 as illustrated in FIG. 11. Also, the upstream edges of slot surfaces 142 are chamfered at 146 (FIG. 13). The chamfering and enlarged head space of the notch insure transition of a stud from track 28 into notch 136 without obstruction.

When shuttle 82 moves from the FIG. 3 position to the FIG. 4 position, a stud in notch 136 is carried from alignment with track 28 into alignment with port 122. An open top guideway 148 is recessed into the top of block 54 and extends across the top of the block in alignment with port 122 and notch 136 in the FIG. 4 position thereof. This guideway extends to a point where it communicates with the upstream end of tube 32.

Guideway 148 is configured generally similarly to notch 136 having side surfaces 150 between which stud head 42 may enter, and shoulders 152 for supporting the undersurfaces 40 of the stud heads, and side surfaces 154 between which the stud shank 44 enters. Shoulders 152 are spaced below the overlying undersurface portions 156 of cover 72 a distance greater than the spacing of notch shoulders 140 below undersurface portions 144 (FIGS. 11 and 12). Also, the upstream end portions of side surfaces 154 are chamfered as at 158. These enlargements insure unobstructed transition of studs 26 from slot 136 to guideway 148. Undersurface portions 156 and 144 respectively of cover 72 pneumatically close the top of guideway 148 and the top of notch 136 in the FIG. 4 position. Thus, when air under pressure issues from port 122, a stud in notch 136 is blown through guideway 148 into tube 132.

The upstream end of tube 32 is secured in alignment with guideway 148 by a holder 160 bolted to block 54 as at 162 and having a tubular socket 164 within which upstream end portions of the tube are inserted. A U-clamp 166 surrounds a portion of socket 164 and is tightened against the socket by a screw 168 (FIG. 5). The socket is slotted at 170 and 172 so that it constricts around tube 132, thereby holding it in place with its upstream end 174 abutted against a side face of block 54 (FIG. 4).

As a precautionary measure to prevent tube 32 from being pulled out of socket 164, the socket is provided with small openings through which the inwardly turned pointed ends 176 of a C-clip 178 enter to penetrate the material of the tube (FIG. 5). Tube 32 is shown as having a flat portion 180 by which it may be circumferentially oriented with respect to equipment to which studs 26 are delivered and with respect to feeder 30 if desired.

The surfaces defining the passageway through tube 32 are in general contoured similarly to those of notch 136 and guideway 148. The passageway has a top 182, side portions 184, between which stud heads 42 pass, shoulders 186 which are disposed beneath the undersurfaces 40 of the stud heads, and sides 188 which straddle stud shanks 44. However, considerably greater clearance is provided between the interior surfaces of the tube and stud 26 so that the tube can be curved around relatively sharp corners without binding against studs passing therethrough. Also, this clearance permits some of the propelling air to leak past a stud travelling through the tube.

One result is that a stud passing through the tube does not attain a velocity so great as to be damaged or cause damage when it is stopped suddenly at the delivery point. It is also believed that this leakage results in the studs riding essentially on an air cushion as they pass through the tube, thereby diminishing any tendency which they might have to tilt and become wedged in the tube.

In use, it may be assumed that a quantity of studs 26 have been placed in hopper 24 and that the hopper is vertically oscillating so that a train of studs in side-by-side relation is introduced into track 28. Feeder 30 is in its rest position of FIG. 3. The train of studs in track 28 slide gravitationally downwardly until the lead screw passes out of the track into shuttle notch 136. When it is desired to deliver a stud to a tool or other equipment at the end of tube 32, a suitable control and valving (not shown) are actuated to introduce air under pressure into cylinder 88, thereby advancing piston 86 and shuttle 82 from the rest position of FIGS. 3 and 7 to the delivery position of FIGS. 4 and 8. The lead stud is carried into alignment between port 122 and guideway 148.

At the same time, air under pressure is conducted to port 122 by passageways 110–118. The compressed air propels the stud out of notch 136, through guideway 148, and through tube 32 to the delivery point. The stud accelerates rapidly in guideway 148, and this plus the larger clearances in the tube insures unobstructed entry of the stud into the tube. When the control and valving are operated to relieve pressure in cylinder 88, piston 86 and shuttle 82 are returned by spring 108 to the rest position of FIGS. 3 and 7. At this time, the second stud of the train in track 28 drops into notch 136 and the entire train advances downwardly one step.

When notch 136 moves out of alignment with track 28, portions of the shuttle adjacent the notch move across the space between rails 34 into alignment with the shank of the then-leading stud of the train in the track. This obstructs downward movement of the train and the leading stud is retained in position where it will drop into notch 136 when the shuttle returns empty. The top upstream edge of shuttle 82 is grooved at 188 so that this portion of the shuttle clears the head of the second stud in the train. A stud is delivered in the manner described each time the control and valving are operated to introduce and relieve pressure in cylinder 88. The control and valving may include suitable timing means (not shown) for continuing the flow of air through port 22 for various periods of time depending on the length of tube 32.

As shown in FIG. 4A, as notch 136 advances to the delivery position of FIG. 4, its trailing edge 190 comes into registry with a wall of recess 76 formed by face 78 of plate 56 before leading edge 192 of the notch registers with port 122. With this arrangement, air is prevented from flowing from port 122 past notch 136 where it might disturb the train of studs in track 28.

Functionally, the surfaces controlling movement of studs 26 are generally similar in track 28, notch 136, guideway 148, and tube 32. In each case, the control surfaces act upon the top 52 and bottom 40 of the stud head. Viewed in this light, track shoulders 38, shoulders 140 in notch 136, and shoulders 152 in guideway 148 provide bottom control surfaces for the studs. In each case, side surfaces are utilized to control the stud by engagement with either head 42 or shank 44.

The control surfaces in track 28, notch 136, and guideway 148 have relatively close tolerances with respect to the respective portions of studs 26 to contain the studs against tilting or cocking to any significant degree. The tolerance of the control surfaces within tube 32 are considerably greater for the purposes described above. In the tube, the only requirement of the control surfaces is that they maintain the stud in its generally sideways attitude with respect to its direction of travel.

In an acual working model of the illustrated device, studs 26 have an overall length of .148" and the diameter of the head is about .200". It is very difficult to control the attitude of such small articles in transition from a hopper to a tube interior, since they tend to tumble and since only relatively small forces are sufficient to cock them out of their intended attitude. Such articles thus tend to catch or hang up in a feeding or transfer device. However, in an apparatus 20 utilizing the present invention, more than 100,000 studs 26 have been fed from a hopper to the end of a tube 32 in their intended attitude at a cyclic rate of more than one per second without failure or malfunctioning of the apparatus. Air under about 20 to 25 p.s.i. was used to propel the studs through a tube about 20 feet long, and the studs traversed the tube in a fraction of a second.

It is believed that apparatus according to the present invention can be used for feeding almost any type of article having surfaces by engagement with which it can be oriented in a particular manner before entering feeder assembly 30, for example, articles having T, L, U, rectangular, oval, arcuate, or irregular angled or curved shapes.

Stand 22 can be placed upon the floor or upon a table at any desired location and can be filled from floor level. Flexible tubing 32 can be routed around corners, or to elevated locations, or up over obstructions and down to a desired delivery point, etc. The tubing can be twisted to deliver a part in any desired rotative orientation. The equipment to which the parts are delivered need not be stationary but can be mobile, the tube flexing to follow its movements.

The part arrives at the delivery point at a low enough velocity to avoid damage to itself or to the equipment which receives it. At the same time, delivery is positive and there is no necessity for relying on gravity to deliver the part from the tube.

Tubing 32 can be made of a flexible plastic material; and in the working model referred to above, tubing made of a plastic commercially available under the name "Tygon" has been found to be satisfactory.

I claim:

1. Apparatus for feeding one at a time from a source to a delivery point in sideways attitude a series of studs each having a shank and a head, said apparatus comprising, a track having spaced-apart rails providing shoulders for slidably supporting the heads of a side-by-side series of studs with the shanks extending therebetween, said track having a top spaced above said rails to contain the stud heads in side-by-side relation on said rails, means operable to introduce studs in said relation into said track, a transfer device having a body with a shuttle reciprocably mounted thereon, said shuttle having an opening aligned in one position of said shuttle for receiving a single stud from said track and displaced laterally from said track in another position of said shuttle, means mounted on said body operable to reciprocate said shuttle to said positions, a guideway having an upstream end aligned with said opening in said other position of said shuttle and a downstream end connected with the internal passageway of a pneumatic tube, said opening and guideway each having spaced-apart shoulders which support the head of a stud therein with the stud shank disposed therebetween, means providing a top for each of said opening and guideway which cooperates with said shoulders for containing a stud therein, the clearance between said shoulders and top of said opening being greater than the clearance between said shoulders and top of said track and the clearance between said shoulders and top of said guideway being greater than the clearance between said shoulders and top of said opening, whereby to facilitate unobstructed transition of a stud from said track to said opening to said guideway, means operable to propel by air under pressure a stud out of said opening in said other position of said shuttle through said guideway and pssageway to said delivery point, said passageway being internally contoured to provide spaced-apart shoulders which support the head of a stud therein with the stud shank disposed therebetween and a top cooperable with said shoulders to maintain said stud in sideways attitude with respect to its direction of travel.

2. The apparatus defined in claim 1 wherein there is a greater clearance between the surfaces defining said passageway and said stud than the clearance between the respective shoulders and top of said passageway, opening, and guideway and a stud, said passageway clearance being sufficient to facilitate escape of air past articles propelled thereby in said tube and to facilitate curving of said tube without binding against articles passing therethrough.

3. In an apparatus having means operable to introduce into a track a series of articles, each having surface portions by engagement with which the article is orientable in a predetermined attitude, a transfer device operable to transfer the articles one at a time from said track into a flexible tube having a longitudinal passageway extending to a delivery point, and means operable to introduce air under pressure into said tube for propelling an article through said passageway, said track, transfer device, and passageway having control surfaces so disposed that they maintain articles therein in said predetermined attitude, improved structure wherein at least certain of said control surfaces upstream of said passageway have relatively close tolerances with respect to said surface portions of said articles, whereby to contain said articles against substantial cocking in transition from said track to said passageway, said control surfaces of said passageway having relatively large tolerances with respect to said surface portions of said articles to facilitate curving of said tube without binding against articles passing therethrough and to facilitate escape of air past articles propelled thereby in said tube.

4. The apparatus defined in claim 3 wherein at least certain of said control surfaces of said transfer device have upstream end portions, said tolerances of which are greater than those of the downstream end portions of said track control surfaces.

5. The apparatus defined in claim 4 wherein said certain of said control surfaces of said transfer device have greater tolerance substantially throughout their length.

6. The apparatus defined in claim 4 wherein said transfer device has a plurality of separate but adjoining control surfaces through which an article passes downstream sequentially, said tolerances of the control surface portions adjacent the juncture downstream thereof being greater than said tolerances of the control surface portions adjacent the juncture upstream thereof.

7. The apparatus defined in claim 6 wherein said control surface portions downstream of said juncture have said greater tolerances substantially throughout their length.

8. The apparatus defined in claim 6 wherein said transfer device includes a guideway laterally offset from said track and a shuttle having an article-receiving opening reciprocable between alignment with said track and guideway, said juncture being between said opening and guideway in aligned condition thereof, said guideway having said control surface portions downstream of said juncture and said opening having the control surfaces upstream thereof.

9. The apparatus defined in claim 8 wherein said guideway control surfaces have said greater tolerance substantially throughout their length.

10. The apparatus defined in claim 3 wherein said transfer device has a guideway laterally offset from said track and communicating with said flexible tube, and a shuttle provided with an article-receiving opening reciprocable between positions in alignment with said track and guideway, said air-introducing means including a port through which propelling air propels an article from said opening through said guideway and into said tube, said opening in transition between said positions being substantially completely pneumatically isolated from said port, whereby to prevent a flow of air from said port against articles in said track.

References Cited by the Examiner
UNITED STATES PATENTS

| 1,145,774 | 7/1915 | Kotkovsky | 221—236 |
| 1,304,900 | 5/1919 | Neff | 221—177 |
| 1,845,651 | 2/1932 | Dickson | 221—177 |
| 2,086,128 | 7/1937 | Hackbarth et al. | 221—236 |
| 2,186,841 | 1/1940 | Rylander | 221—236 |
| 2,540,604 | 2/1951 | Van Sittert et al. | 221—278 |
| 2,569,891 | 10/1951 | Holter | 221—278 |
| 3,038,637 | 6/1962 | Zakrzewski et al. | 221—278 |
| 3,163,324 | 12/1964 | Lupo | 221—278 |
| 3,175,240 | 3/1965 | Hillard | 221—278 |

ROBERT B. REEVES, *Primary Examiner.*

WALTER SOBIN, *Examiner.*